United States Patent
Bajwa et al.

(10) Patent No.: US 11,225,003 B2
(45) Date of Patent: Jan. 18, 2022

(54) HOT RUNNER SYSTEM

(71) Applicant: Mold-Masters (2007) Limited, Georgetown (CA)

(72) Inventors: Gurvinder Bajwa, Brampton (CA); Douglas Ursu, Orangeville (CA); Denis Babin, Georgetown (CA)

(73) Assignee: Mold-Masters (2007) Limited, Georgetown (CA)

( * ) Notice: Subject to any disclaimer, the term of this patent is extended or adjusted under 35 U.S.C. 154(b) by 0 days.

(21) Appl. No.: 16/850,194

(22) Filed: Apr. 16, 2020

(65) Prior Publication Data

US 2020/0331182 A1    Oct. 22, 2020

Related U.S. Application Data

(60) Provisional application No. 62/835,219, filed on Apr. 17, 2019.

(51) Int. Cl.
*B29C 45/27* (2006.01)
*B29C 45/20* (2006.01)
*B29C 45/74* (2006.01)

(52) U.S. Cl.
CPC .......... *B29C 45/2737* (2013.01); *B29C 45/20* (2013.01); *B29C 45/74* (2013.01);
(Continued)

(58) Field of Classification Search
CPC ................ B29C 45/74; B29C 45/2737; B29C 2045/2759; B29C 2045/2762;
(Continued)

(56) References Cited

U.S. PATENT DOCUMENTS 4,173,448 A * 11/1979 Rees ............... B29C 45/281
251/62
4,268,240 A * 5/1981 Rees ............... B29C 45/281
425/548
(Continued)

FOREIGN PATENT DOCUMENTS

CN   104999625 A   10/2015
EP   0590678 A1   4/1994
(Continued)

*Primary Examiner* — Xiao S Zhao
*Assistant Examiner* — Emmanuel S Luk
(74) *Attorney, Agent, or Firm* — Medler Ferro Woodhouse & Mills PLLC

(57) ABSTRACT

A hot runner system having a nozzle received in a well in a mold plate. The nozzle has a melt channel, a nozzle body through which the melt channel extends, and a collar connected to and spaced apart from the nozzle body. A manifold is seated against the nozzle. The manifold has a melt channel in fluid communication between a source of moldable material and the nozzle channel. A bearing member against which a seating surface of the collar is supported is received in the well, and a biasing member is seated between a step in the well and the bearing member. The biasing member has plate loading surface and a nozzle loading surface. The nozzle loading surface and the plate loading surface are concentric with the seating surface of the collar and are circumferentially offset from the seating surface of the collar in opposite directions.

18 Claims, 7 Drawing Sheets

(52) U.S. Cl.
CPC ............... *B29C 2045/2759* (2013.01); *B29C 2045/2762* (2013.01)

(58) Field of Classification Search
CPC .............. B29C 2045/277; B29C 45/20; B29C 2045/202; B29C 2045/2796; B29C 2045/2798; B29C 2045/2775
See application file for complete search history.

(56) References Cited

U.S. PATENT DOCUMENTS

| | | | |
|---|---|---|---|
| 4,588,367 A | 5/1986 | Schad | |
| 5,049,062 A * | 9/1991 | Gellert | B29C 45/28 425/549 |
| 5,374,182 A * | 12/1994 | Gessner | B29C 45/27 264/328.9 |
| 6,220,851 B1 | 4/2001 | Jenko | |
| 6,309,207 B1 | 10/2001 | Kalemba | |
| 6,343,925 B1 * | 2/2002 | Jenko | B29C 45/281 264/328.15 |
| 6,368,542 B1 * | 4/2002 | Steil | B29C 45/2725 264/328.14 |
| 6,555,044 B2 | 4/2003 | Jenko | |
| 6,669,462 B1 * | 12/2003 | Jenko | B29C 45/27 264/328.15 |
| 6,860,732 B2 * | 3/2005 | Babin | B29C 45/27 264/328.15 |
| 6,890,473 B2 * | 5/2005 | Ho | B29C 45/27 264/328.1 |
| 7,165,958 B2 * | 1/2007 | Jenko | B29C 45/2701 425/149 |
| 7,189,071 B2 * | 3/2007 | Olaru | B29C 45/27 425/549 |
| 7,244,118 B2 | 7/2007 | Olaru | |
| 7,381,050 B2 | 6/2008 | Fairy | |
| 7,396,226 B2 | 7/2008 | Fairy | |
| 8,142,183 B2 | 3/2012 | Jenko | |
| 8,597,019 B2 * | 12/2013 | Deriche | B29C 45/27 425/549 |
| 8,939,756 B2 | 1/2015 | Overfield et al. | |
| 10,160,148 B2 | 12/2018 | Overfield | |
| 2003/0143298 A1 * | 7/2003 | Blais | B29C 45/281 425/130 |
| 2004/0005380 A1 * | 1/2004 | Babin | B29C 45/2725 425/569 |
| 2008/0171100 A1 * | 7/2008 | Bouti | B29C 45/2806 425/569 |
| 2009/0194910 A1 | 8/2009 | Rosner et al. | |
| 2013/0287888 A1 * | 10/2013 | Overfield | B29C 45/20 425/567 |
| 2013/0309349 A1 | 11/2013 | Blais | |
| 2014/0037783 A1 * | 2/2014 | Gray | B29C 45/20 425/568 |
| 2014/0183790 A1 * | 7/2014 | Ciccone | B29C 45/27 264/328.15 |
| 2016/0151948 A1 * | 6/2016 | Jenko | B29C 45/2737 425/549 |

FOREIGN PATENT DOCUMENTS

| | | |
|---|---|---|
| EP | 1372929 B1 | 3/2005 |
| FR | 2946914 A1 | 12/2010 |

* cited by examiner

HOT RUNNER SYSTEM

CROSS-REFERENCE TO RELATED APPLICATION

The present application claims benefit of prior U.S. Appl. No. 62/835,219 filed Apr. 17, 2019, which is incorporated by reference herein in its entirety.

TECHNICAL FIELD

The present disclosure generally relates to hot runner injection molding. More particularly, the present disclosure relates to a nozzle and manifold sealing arrangement for a hot runner system.

BACKGROUND

Injection molding is a process in which a moldable material, typically a polymeric material, is heated and injected under pressure into a mold having a mold cavity which conforms to the shape of a molded article produced in the mold. Once the newly injected moldable material cools and solidifies in the mold cavity, the mold is opened, and the newly molded article is removed from the mold. Often the mold employs a hot runner system which maintains the moldable material in a molten state between a nozzle of a molding machine and the mold cavity. The hot runner system includes a series of runner components having adjoining channels through which the molten material flows as it is injected, e.g., a manifold delivering moldable material to one or more nozzles. To maintain operational efficiency of the hot runner system it is desirable to maintain a fluid seal between each nozzle and the manifold from which it receives moldable material.

SUMMARY

Embodiments hereof are directed to a hot runner system including a nozzle received in a well in a mold plate, the nozzle has a nozzle melt channel for delivering moldable material to a mold cavity, a heated nozzle body through which the nozzle melt channel extends, and a collar connected to the nozzle body, the collar surrounds and is spaced apart from the nozzle body. A manifold is seated against an upstream end of the nozzle, the manifold has a manifold melt channel having an inlet for receiving moldable material from a source and an outlet in fluid communication with the nozzle channel. A nozzle bearing member against which a seating surface of the collar is supported is received in the well, and a biasing member is seated between a step in the well and the bearing member, the biasing member has plate loading surface through which biasing force is applied to the mold plate and a nozzle loading surface through which biasing force is applied to the bearing member to urge the upstream end of the nozzle against the manifold when the biasing member is compressed. The nozzle loading surface is concentric with and circumferentially offset from the seating surface of the collar and the plate loading surface is concentric with and circumferentially offset from the seating surface of the collar in the opposite direction as nozzle loading surface is circumferentially offset from the seating surface of the collar.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. Furthermore, there is no intention to be bound by any expressed or implied theory presented in the preceding technical field, background, brief summary or the following detailed description.

Figure 1:
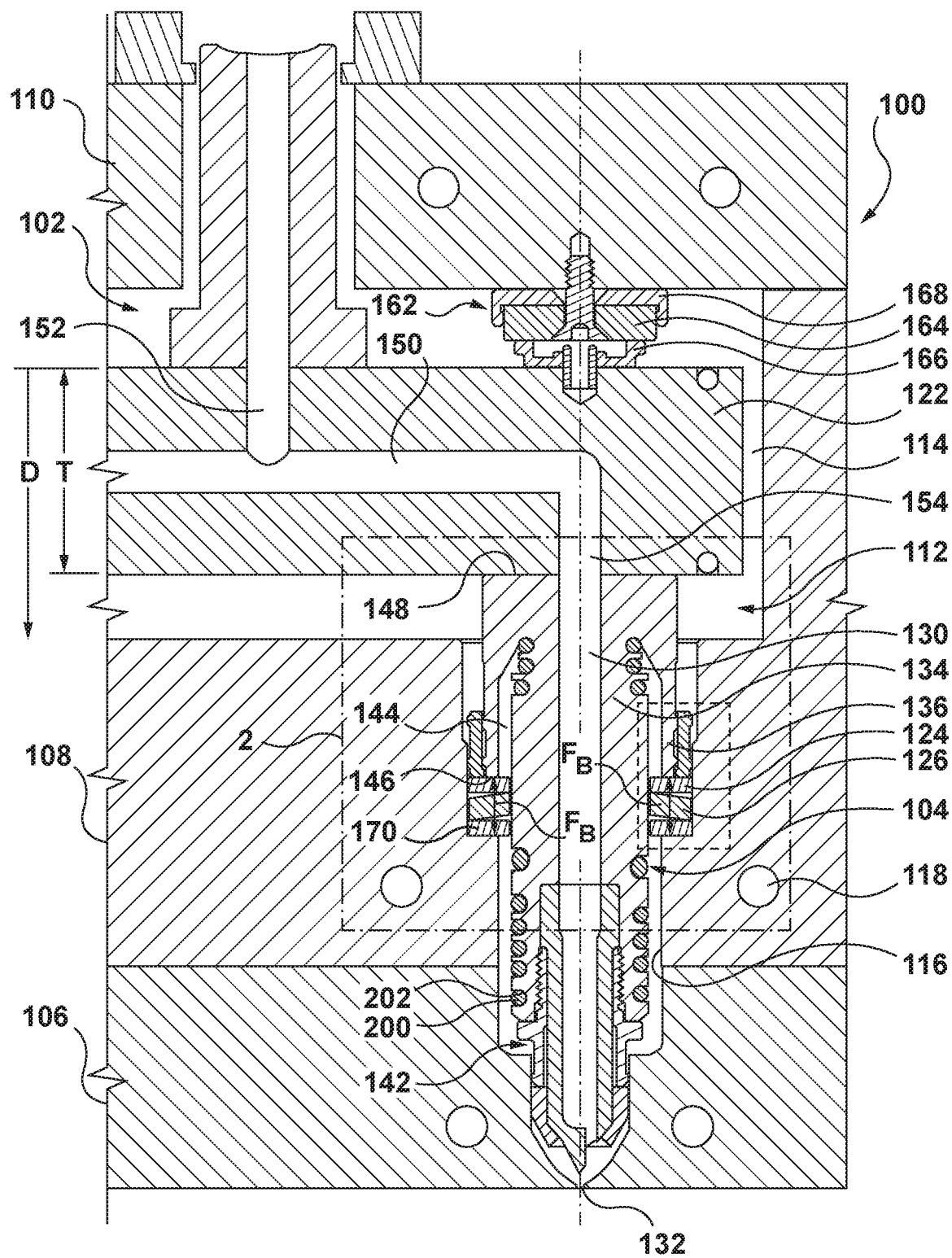
FIG. 1 is a sectional view of a portion of an injection molding apparatus having a hot runner system and a hot runner nozzle in accordance with an embodiment of the present disclosure.

FIG. 1 is a sectional view of a portion of an injection molding apparatus 100 having a hot runner system 102 and a hot runner nozzle 104 in accordance with an illustrated embodiment of the present disclosure. Hot runner nozzle 104 can also be referred to as nozzle 104. Injection molding apparatus 100 includes a plurality of mold plates, for example, a first mold plate 106, a second mold plate 108, and a third mold plate 110 (collectively referred to as mold plates 106, 108, 110) which form an enclosure 112 in which hot runner system 102 is received. Enclosure 112 includes a manifold chamber 114 and a nozzle well 116 that extends forward or downstream from manifold chamber 114. Mold plates 106, 108, 110 can include cooling channels, such as cooling channel 118 within second mold plate 108, through which cooling fluid is circulated to maintain injection molding apparatus 100 at a suitable molding temperature. As is commonly known, mold plates 106, 108, 110 are held together by fasteners (not shown), and may also include additional fastening and/or aligning components such as guide pins, guide bushings etc. as would be understood by one of ordinary skill in the art. While three mold plates 106, 108, 110 are shown, injection molding apparatus 100 can include other than three mold plates.

Hot runner system 102 includes nozzle 104, a hot runner manifold 122 (only a portion of which is shown) a nozzle bearing member 124 and a biasing member 126. Hot runner manifold 122 can also be referred to as manifold 122. Nozzle well 116 is sized to form an insulating air gap around nozzle 104, and manifold chamber 114 is sized to form an insulating air gap around manifold 122.

Nozzle 104 is received in nozzle well 116 and is supported in nozzle well 116 by nozzle bearing member 124. Nozzle 104 includes a nozzle melt channel 130 for delivering moldable material to a mold cavity (not shown) via a mold gate 132 at the downstream end of nozzle well 116. Nozzle 104 further includes a heated nozzle body 134 through which nozzle channel 130 extends and a nozzle collar 136 that is connected to nozzle body 134. Nozzle collar 136 can be referred to as collar 136. Nozzle well 116 includes an upstream well portion that surrounds collar 136 and a downstream well portion that surrounds nozzle body 134. Nozzle 104 optionally includes a removable nozzle tip 142 coupled to the downstream end of nozzle body 134 in fluid communication with nozzle melt channel 130. Alternatively, nozzle tip 142 is conjoined with nozzle body 134. Collar 136 coaxially surrounds nozzle body 134 and is spaced apart therefrom such that an insulating gap 144 is formed between nozzle body 134 and collar 136. A downstream or forward-facing end of collar 136 defines a nozzle seating surface 146 against which nozzle 104 is supported within nozzle well 116.

While only a single nozzle 104 is shown, hot runner system 102 may include a plurality of nozzles 104. Further, hot runner system 102 is shown as having a thermal gating or tip gating nozzle 104 by way of example and not limitation. Alternatively, hot runner system 102 can include valve gating nozzle(s) or a combination of thermal gating and valve gating nozzles.

Manifold 122 is supported within manifold chamber 114 against an upstream end 148 of nozzle 104. Manifold 122 includes a manifold melt channel 150 that extends therethrough. Manifold melt channel 150 includes an inlet 152 at its upstream end for receiving moldable material from a source. At its downstream end, manifold channel 150 includes an outlet 154 which is in fluid communication with nozzle channel 130.

Figure 2:
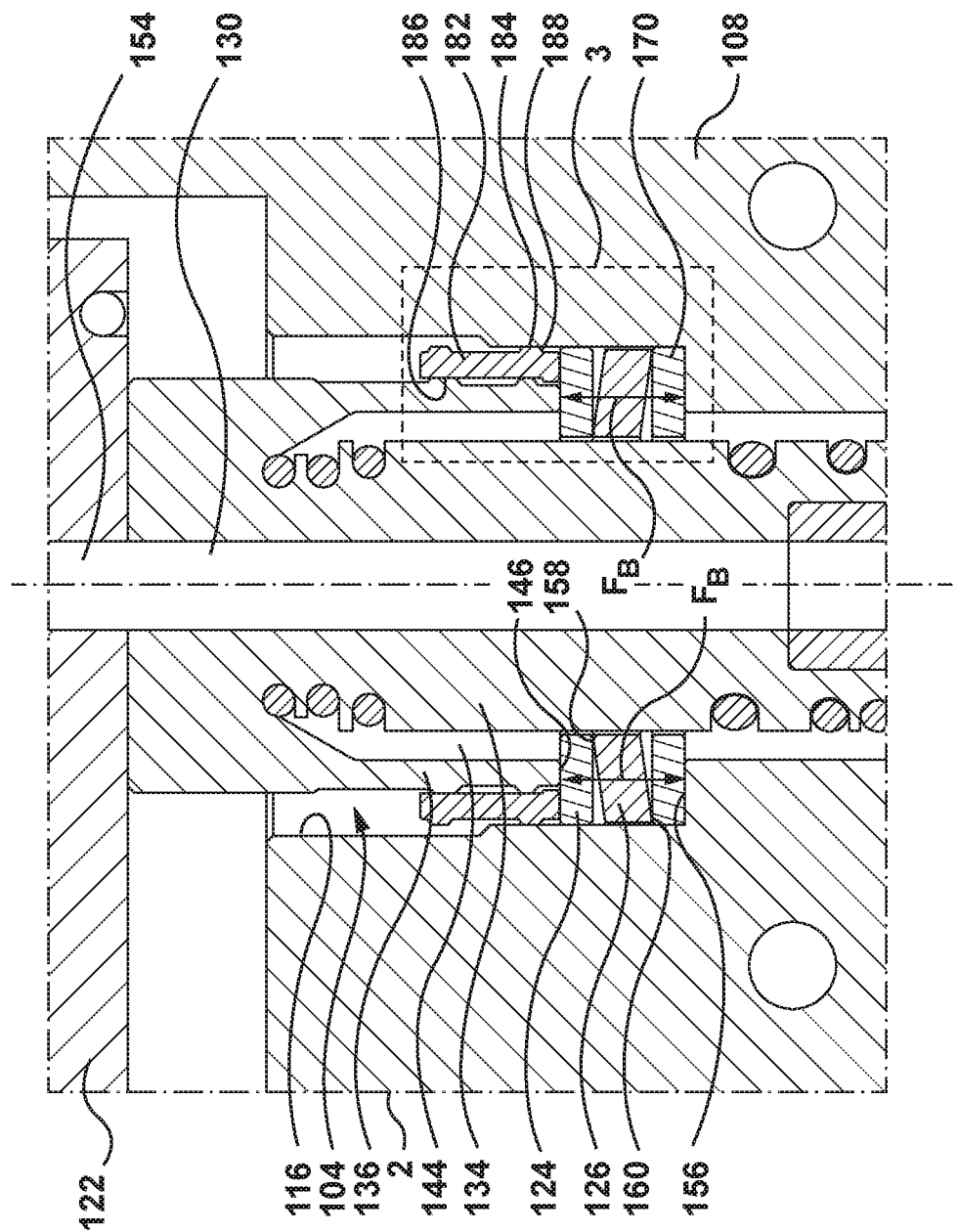
FIG. 2 is an enlarged view of a portion 2 of the hot runner system of FIG. 1.

Referring now to FIG. 2, which is an enlarged view of a portion 2 of FIG. 1, biasing member 126 is seated between a step 156 in nozzle well 116 and nozzle bearing member 124. At its upstream end, biasing member 126 includes a nozzle loading surface 158 through which biasing force, shown by double ended arrows $F_B$ in FIG. 2, is applied against collar 136 via nozzle bearing member 124. In other words, biasing member 126 applies biasing force $F_B$ to nozzle 104 through nozzle bearing member 124. Biasing force $F_B$ urges nozzle 104 against manifold 122 so as to promote a fluid seal between manifold outlet 154 and nozzle channel 130. Nozzle loading surface 158 is concentric with and circumferentially offset from nozzle seating surface 146. As used herein, "concentric" and "coaxial" includes concentric and coaxial within normal manufacturing tolerances for aligning hot runner components, also, as used herein "circumferentially offset" means loading surfaces 158, 160 are not in line with nozzle seating surface 146. Nozzle loading surface 158 is axially separated from nozzle seating surface 146 by nozzle bearing member 124. At its downstream end, biasing member 126 includes a plate loading surface 160 through which biasing force $F_B$ is applied against mold plate 108. Plate loading surface 160 is concentric with and circumferentially offset from nozzle seating surface 146 in the opposite direction as nozzle loading surface 158 is offset from nozzle seating surface 146. Offsetting nozzle loading surface 158 from nozzle seating surface 146 allows for closer nozzle pitch spacing with a larger biasing member 126 than if nozzle loading surface 158 was aligned with nozzle seating surface 146.

Continuing with FIG. 2 and also referring to FIG. 1, manifold 122 is supported within manifold chamber 114 between upstream end 148 of nozzle 104 and a manifold bearing member 162 which, as shown by way of example, is in line with nozzle 104. A non-limiting example of manifold bearing member 162 is shown in FIG. 1 in which manifold bearing member 162 includes an intermediate component 164 that is sandwiched between a forward spacer member 166 which is coupled to or seated against manifold 122, and a rearward spacer member 168, which is coupled to or seated against third mold plate 110. By way of example, forward and rearward spacer members 166, 168, can be made from a metallic material, and intermediate component 164 can be made from a material that is less thermally conductive than forward and rearward spacer members 166, 168, an example of which includes a ceramic material. When mold plates 108, 110 are assembled together, manifold bearing member 162 is sandwiched between manifold 122 and third mold plate 110, and presses manifold 122 against nozzle 104 (downward on page view of FIG. 1) which also presses collar 136 against nozzle bearing member 124 and compresses biasing member 126 towards step 156. When biasing member 126 compressed in this manner, biasing force $F_B$ is created. This biasing force $F_B$ is transferred through nozzle bearing member 124 to collar 136 to urge nozzle 104 against manifold 122 to promote a fluid seal between manifold 122 and nozzle 104. As manifold 122 is heated, thermal expansion of manifold 122 across its thickness (shown by double ended arrow T in FIG. 1) is generally limited to the downstream direction (shown by arrow D in FIG. 1) due to manifold bearing member 162 being sandwiched between manifold 122 and mold plate 110. In this arrangement, as the temperature, and consequently the thickness of manifold 122 increases, biasing member 126 is further compressed, thus increasing biasing force $F_B$ between nozzle 104 and manifold 122 as nozzle 104 is pressed further downward by manifold 122 which has the effect of increasing the sealing force between nozzle 104 and manifold 122 as the temperature of manifold 122 increases.

As shown in FIG. 2, biasing member 126 is positioned such that nozzle loading surface 158 is circumferentially offset from nozzle seating surface 146, towards nozzle body 134, and is in line with insulating gap 144 and plate loading surface 160 is circumferentially offset from nozzle seating surface 146, away nozzle body 134 and is in line with step 156. When bearing member is oriented as shown in FIG. 2 hot runner system 102 can optionally include a plate bearing member 170 sandwiched between biasing member 125 and step 156 against which biasing member 126 is seated, and through which biasing force FB is applied against second mold plate 108. Plate bearing member 170 may be useful in molding applications in which biasing force FB created by biasing member 126 may be sufficient to mar step 156, by, for example, hobbing into second mold plate 108. Nozzle bearing member 124 and plate bearing member 170 are washer-shaped components which can collectively be referred to as bearing members 124, 170. Bearing members 124, 170 can be the same or substantially the same component or can be different from each other. For example, the thickness of one of bearing members 124, 170 can be different from the other bearing member 124, 170 so as to affect the amount of sealing force between nozzle 104 and manifold 122 That is, increasing the thickness of one or both bearing members 124, 170 increases the biasing force FB of biasing member 126 when biasing member 126 is compressed against step 156. Conversely, decreasing the thickness of one or both bearing members 124, 170 has the opposite effect when biasing member 126 is compressed against step 156. As used herein, "nozzle loading surface 158" includes biasing member 126 having a line-contact with nozzle bearing member 124. Also, as used herein, "plate loading surface 160" includes biasing member 126 having a line-contact with plate bearing member 170 or a line-contact with step 156.

Figure 4:
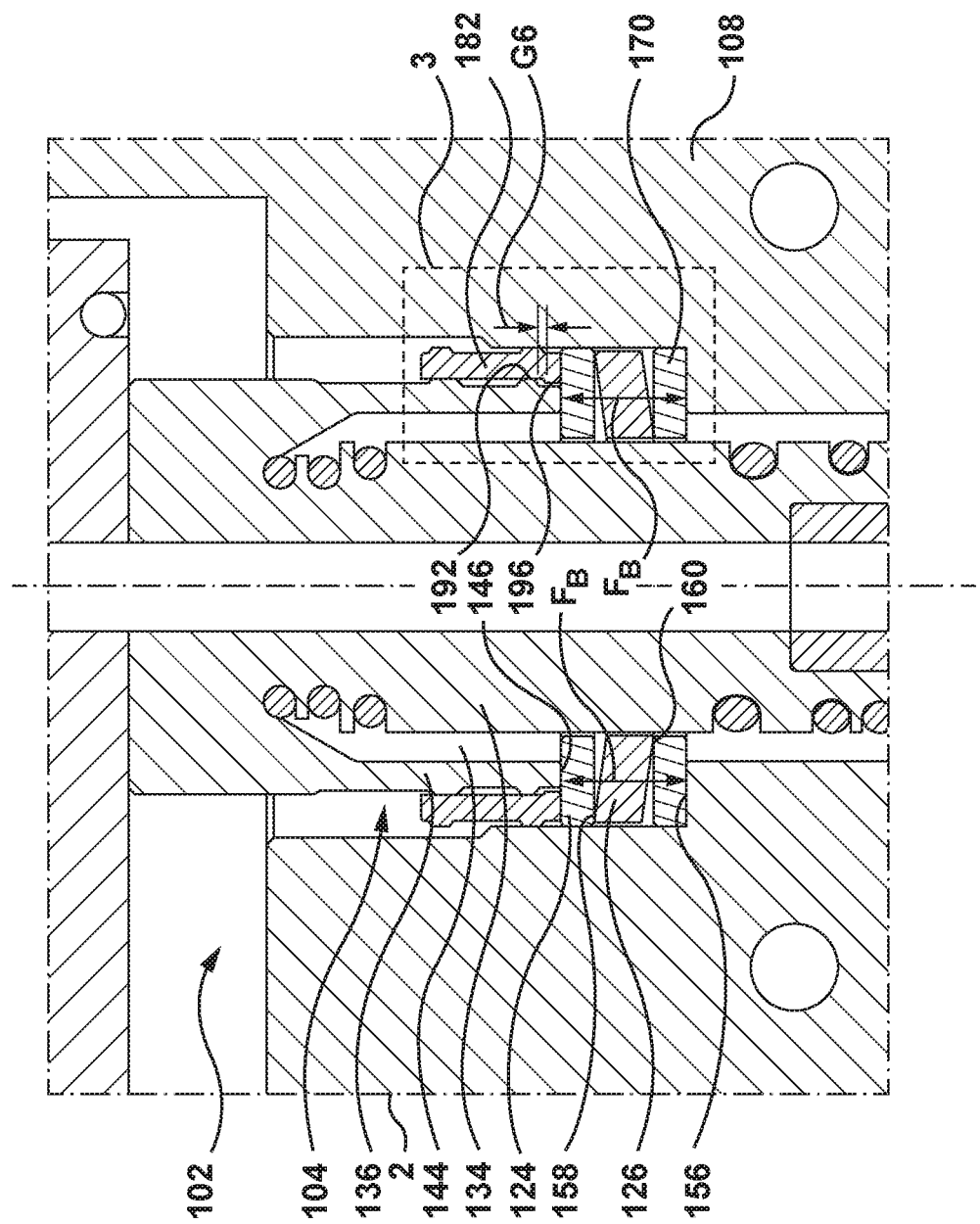
FIG. 4 is an enlarged view of portion 2 of FIG. 1 showing an alternative orientation of a biasing member of the hot runner system in accordance with another embodiment of the present disclosure.

Referring to FIG. 4 which is an enlarged view of portion 2 of FIG. 1 showing an alternative orientation of biasing member 126 in accordance with another illustrated embodiment of the present disclosure. As shown in FIG. 4, biasing member 126 is positioned in nozzle well 116 such that nozzle loading surface 158 is circumferentially offset from nozzle seating surface 146 away nozzle body 134 and is in line with step 156, and plate loading surface 160 is circumferentially offset from nozzle seating surface 146 toward nozzle body 134 and is in line with insulating gap 144. When biasing member 126 is orientated in this configuration hot runner system 102 includes nozzle bearing member 124 and plate bearing member 170 against which plate loading surface 160 of biasing member 126 is seated and through which biasing force $F_B$ is applied against second mold plate 108.

Biasing member 126 and bearing members 124, 170 are annular shaped, and are sized to be received in nozzle well 116, and to permit nozzle body 134 to pass therethrough. Biasing member 126 and bearing members 124, 170 are spaced apart from nozzle body 134 so as to limit or prevent heat loss from nozzle 104. One way of achieving this is shown clearly in FIG. 3, which is an enlarged view of a portion 3 of FIG. 2. Bearing members 124, 170 are sized to be slidably received in the upstream portion of nozzle well 116, and have respective openings 172, 174 through which nozzle body 134 extends. Openings 172, 174 are sized to ensure a gap, shown at locations G1, G1', between nozzle body 134 and bearing members 124, 170. Biasing member 126 also has an opening 176 through which nozzle body 134 extends. With regard to nozzle well 116, biasing member 126 is sized to allow for a gap, shown at location G2, between biasing member 126 and second mold plate 108 which accommodates outward flexing of biasing member 126 when biasing member 126 is compressed. Since there is a gap G2 between biasing member 126 and nozzle well 116, biasing member 126 can be positioned laterally (left and right in the page view of FIG. 2) relative to nozzle well 116. To accommodate a laterally offset position of biasing member 126 while inhibiting contact between biasing member 126 and nozzle body 134, opening 176 in biasing member 126 is sized to be spaced apart from nozzle body 134 by a gap, shown at location G3, which is larger than the size of the gap, shown at location G2, between biasing member 126 and the portion of nozzle well 116 in which biasing member 126 is received. The gap configuration described above with regard biasing member 126 and nozzle well 116 can also be applied to one or both of nozzle bearing member 124 and plate bearing member 170 so as to inhibit contact between bearing members 124, 170 and nozzle body 134. That is, the size of a gap G1 between nozzle bearing member 124 and nozzle body 134 is greater than the size of a gap between nozzle bearing member 124 and the portion of nozzle well 116 in which nozzle bearing member 124 is received. It should also be appreciated that when biasing member 126 is compressed as previously described the lateral positioning (left and right in the page view of FIGS. 2 and 4) of biasing member 126 and bearing members 124, 170 can be described as generally fixed within nozzle well 116. Further, although the gap between biasing member 126 and second mold plate 108, shown at location G2, permits lateral positioning variability of biasing member 126, and thus nozzle and plate loading surfaces 158, 160 of biasing member 126 within nozzle well 116, such variability is still considered to fall within nozzle and plate loading surfaces 158, 160 being concentric with nozzle seating surface 146 as described above. Also as shown herein, biasing member 126 is a Belleville washer; however, other types of biasing members are contemplated, for example, biasing member 126 can also be a conical compression spring.

Figure 3:
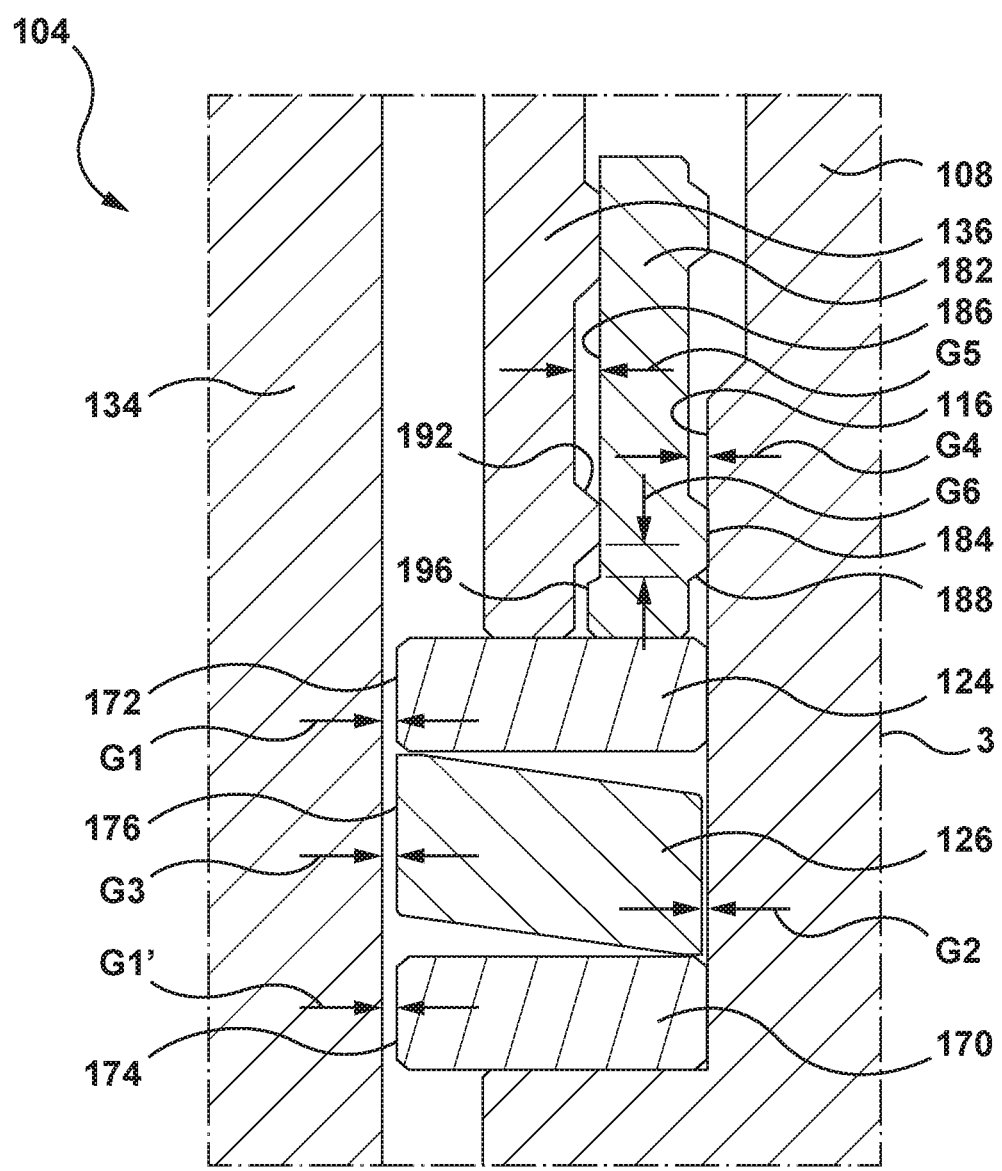
FIG. 3 is an enlarged view of a portion 3 of FIG. 2.

Continuing with FIG. 3, and also referring to FIG. 2, Nozzle 104 includes a collar bushing or sleeve 182 seated in nozzle well 116 between collar 136 and second mold plate 108. Sleeve 182 is slidably received in nozzle well 116, and collar 136 is slidably received in sleeve 182. Together, sleeve 182 and collar 136 coaxially align nozzle 104 with nozzle well 116. Sleeve 182 surrounds collar 136 and includes an external alignment surface 184 that extends around sleeve 182 and is sized to mate with nozzle well 116. Sleeve 182 also includes an internal alignment surface 186 that interfaces with collar 136.

While configurable in a variety of ways, external alignment surface 184 is defined by a protrusion 188 that extends circumferentially around and radially outward from sleeve 182 and engages with nozzle well 116. Protrusion 188 limits the amount of contact between sleeve 182 and second mold plate 108 and creates a gap, shown at location G4 in FIG. 3, between sleeve 182 and second mold plate 108. While configurable in a variety of ways, internal alignment surface 186 is an inner circumferential surface of sleeve 182 that interfaces with a collar protrusion 192 that extends radially outward from collar 136. This arrangement limits the amount of contact between collar 136 and sleeve 182 and creates a gap, shown at location G5 in FIG. 3, between collar 136 and sleeve 182.

Heat transfer between the upstream end of nozzle 104 and second mold plate 108 passes through collar 136, across the interface between collar 136 and sleeve 182, and through sleeve 182 prior to reaching second mold plate 108. The gap, shown at location G5 in FIG. 3, between collar 136 and sleeve 182, the gap, shown at location G4 in FIG. 3, between sleeve 182 and second mold plate 108 reduces the rate of heat transfer between nozzle 104 and second mold plate 108. Sleeve 182 can be constructed from the same material as collar 136 or can be constructed from a material that is less thermally conductive than collar 136, which can further reduce the rate of heat transfer between nozzle 104 and second mold plate 108.

Continuing with FIG. 3, sleeve 182 is seated or received in nozzle well 116. Nozzle bearing member 124 restricts movement of sleeve 182 in the downstream direction or downward in the page view of FIG. 3. As shown herein, sleeve 182 is in its most downstream position, seated against nozzle bearing member 124. As mentioned above, sleeve 182 is slidably received in nozzle well 116, and collar 136 is slidably received in sleeve 182. According to this arrangement, sleeve 182 is axially displaceable along collar 136 (upward in the page view of FIG. 3). However, axial displacement of sleeve 182 in the upstream direction is limited so as to maintain interfacing or aligning engagement between collar 136, sleeve 182, and nozzle well 116. In other words, movement of sleeve 182 in a direction away from nozzle bearing member 124 is restricted to prevent external alignment surface 184 from disengaging nozzle well 116 and to prevent internal alignment surface 186 from disengaging collar protrusion 192. While this can be configured in a variety of ways, as shown most clearly in FIG. 3, sleeve 182 includes an inner protrusion 196 that projects inward towards collar 136 and overlaps collar protrusion 192 so as to limit axial displacement of sleeve 182 away from nozzle bearing member 124. Shown by way of example, inner protrusion 196 is axially spaced apart from collar protrusion 192 so as define an axial gap, shown at location G6, between sleeve inner protrusion 196 and collar protrusion 192. In an embodiment such as shown in FIG. 4, in which nozzle loading surface 158 is in line with step 156 and sleeve 182, the axial distance between inner protrusion 196 and collar protrusion 192, shown at gap G6 can be sized such that sleeve 182 can be axially displaced (upwards in the page view of FIG. 4) relative to collar 136 by an amount that is equal to or greater than a calculated deflection amount of nozzle bearing member 124 at nozzle loading surface 158 when biasing member 126 is compressed. In this configuration, sleeve 182 can be described as being independent from biasing force $F_B$ applied towards collar 136.

Referring to FIG. 1, nozzle 104 is heated by way of an element heater 200 that is received in a groove 202 in nozzle body 134. While groove 202 can be configured in a variety of ways, as shown, groove 202, and heater element 200 received therein, follow a pathway, helical or otherwise shaped, along nozzle body 134, from the downstream end thereof, through biasing member 126 and nozzle bearing member 124, and are surrounded by collar 136 and spaced apart therefrom by insulating gap 144. In an alternative embodiment, groove 202, and element heater 200 received therein, extend between a downstream end of nozzle body 134 and biasing member 126 such that only a downstream end of nozzle body 134 is heated by way of contact with a heater element.

Figure 5:
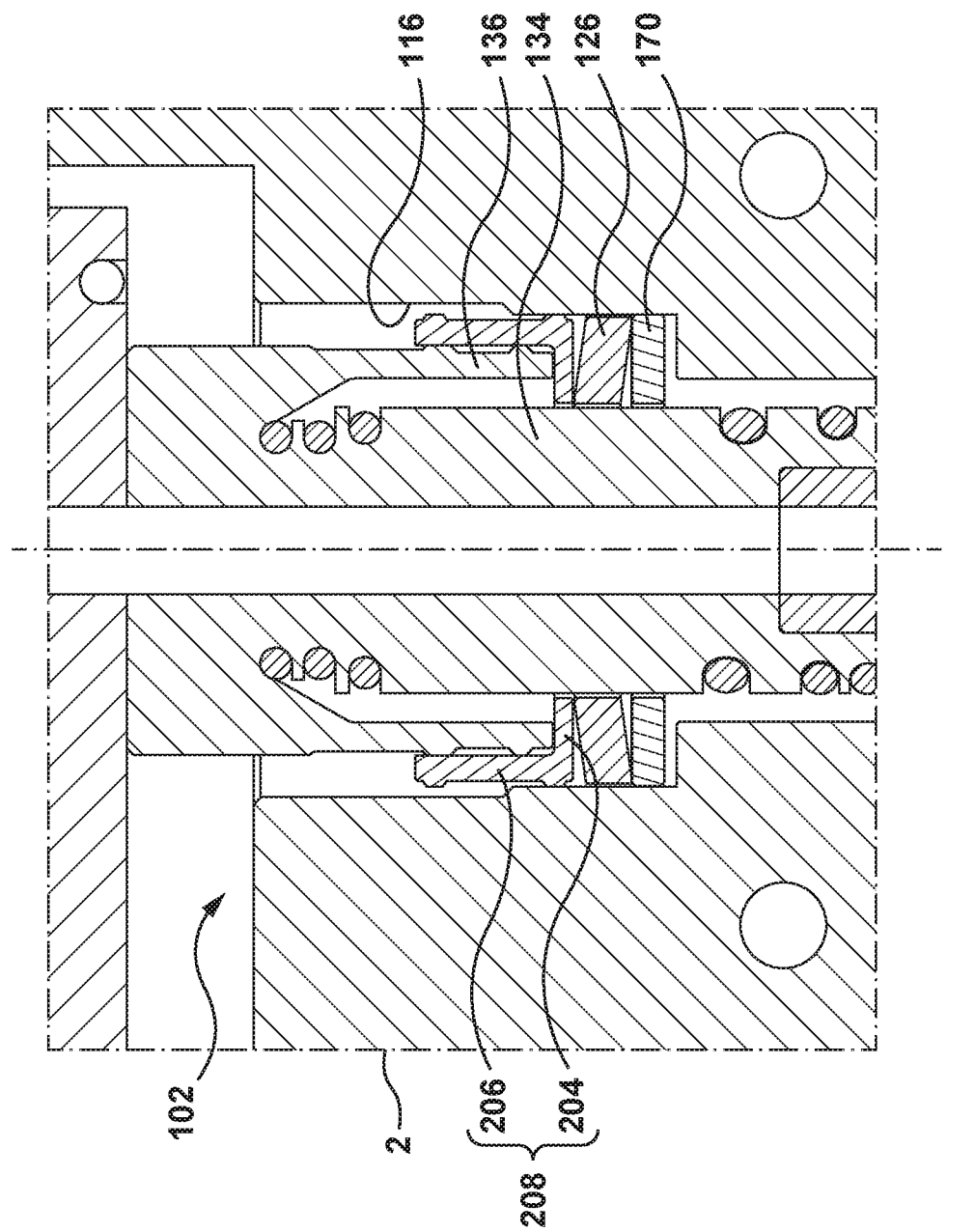
FIG. 5 is an enlarged view of portion 2 of FIG. 1 in which the nozzle is located by a one-piece bearing and sleeve component in accordance with yet another embodiment of the present disclosure.
Figure 6:
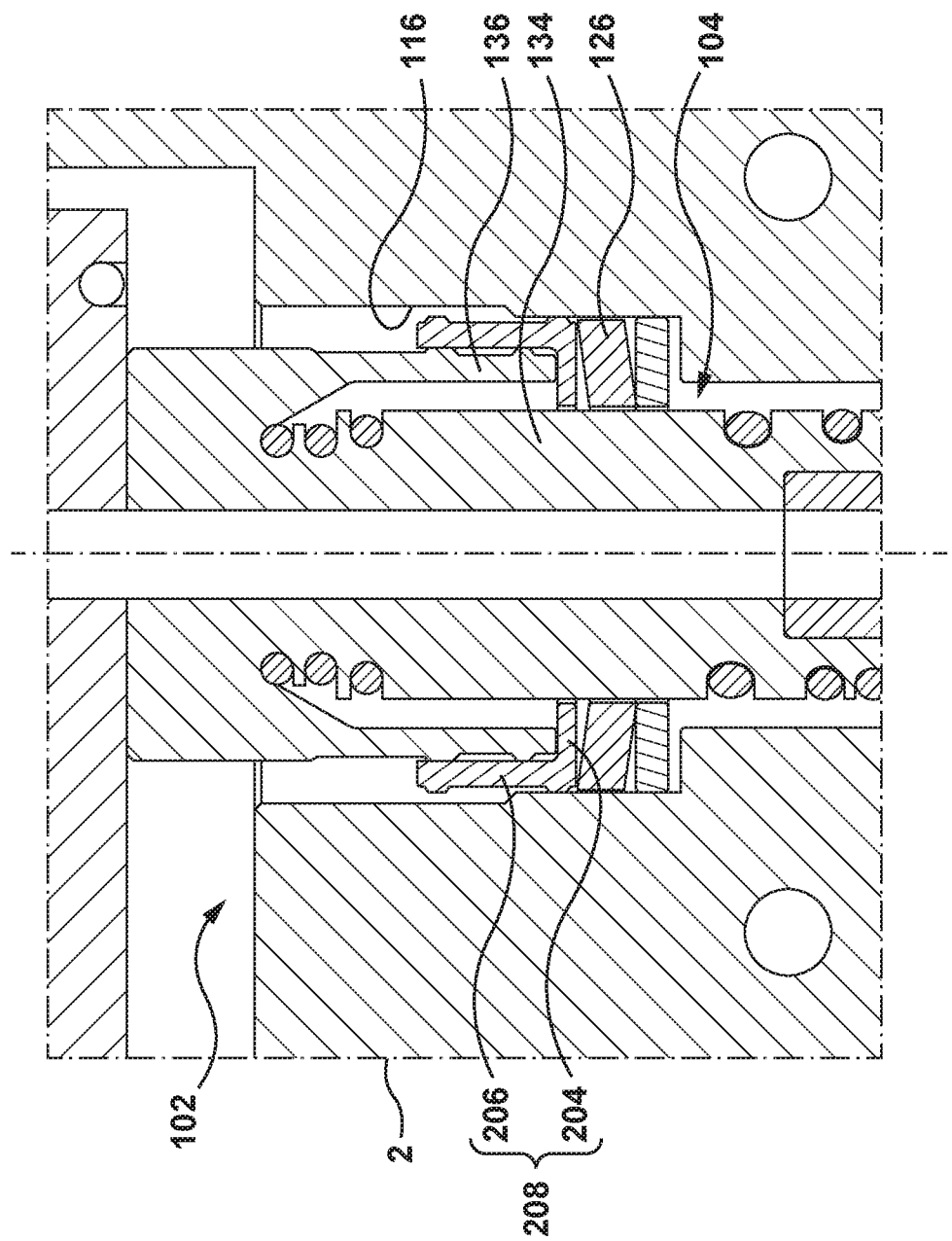
FIG. 6 is an enlarged view of portion 2 of FIG. 1 in which the nozzle is located by a one-piece bearing and sleeve component in accordance with yet another embodiment of the present disclosure.

Referring now to FIGS. 5 and 6, which are enlarged views of portion 2 of FIG. 1 showing a portion of hot runner system 102 in which nozzle 104 is located in nozzle well by a unitary or one-piece bearing-sleeve component 208 in accordance with yet another illustrated embodiment of the present disclosure. Features and aspects of the illustrated embodiments of FIGS. 5 and 6 are similar to those previously described, and as such notable differences will be described. Unlike the illustrated embodiments of FIGS. 1-4 in which nozzle bearing member 124 and sleeve 182 are discrete components, in the illustrated embodiment of FIGS. 5 and 6 the nozzle bearing member and the sleeve are a nozzle bearing portion 204 and sleeve portion 206 of a unitary or one-piece component 208. Nozzle body 134 extends through bearing-sleeve component 208. When biasing member is compressed, nozzle bearing portion 204 is sandwiched between collar 136 and biasing member 126 which secures bearing-sleeve component 208 within nozzle well 116. In the illustrated embodiment of FIG. 5, biasing member 126 is positioned as described above with regard to the position of biasing member 126 in FIGS. 1 and 2. In the illustrated embodiment of FIG. 6, biasing member 126 is positioned as described above with regard to the position of biasing member 126 in FIG. 4.

Figure 7:
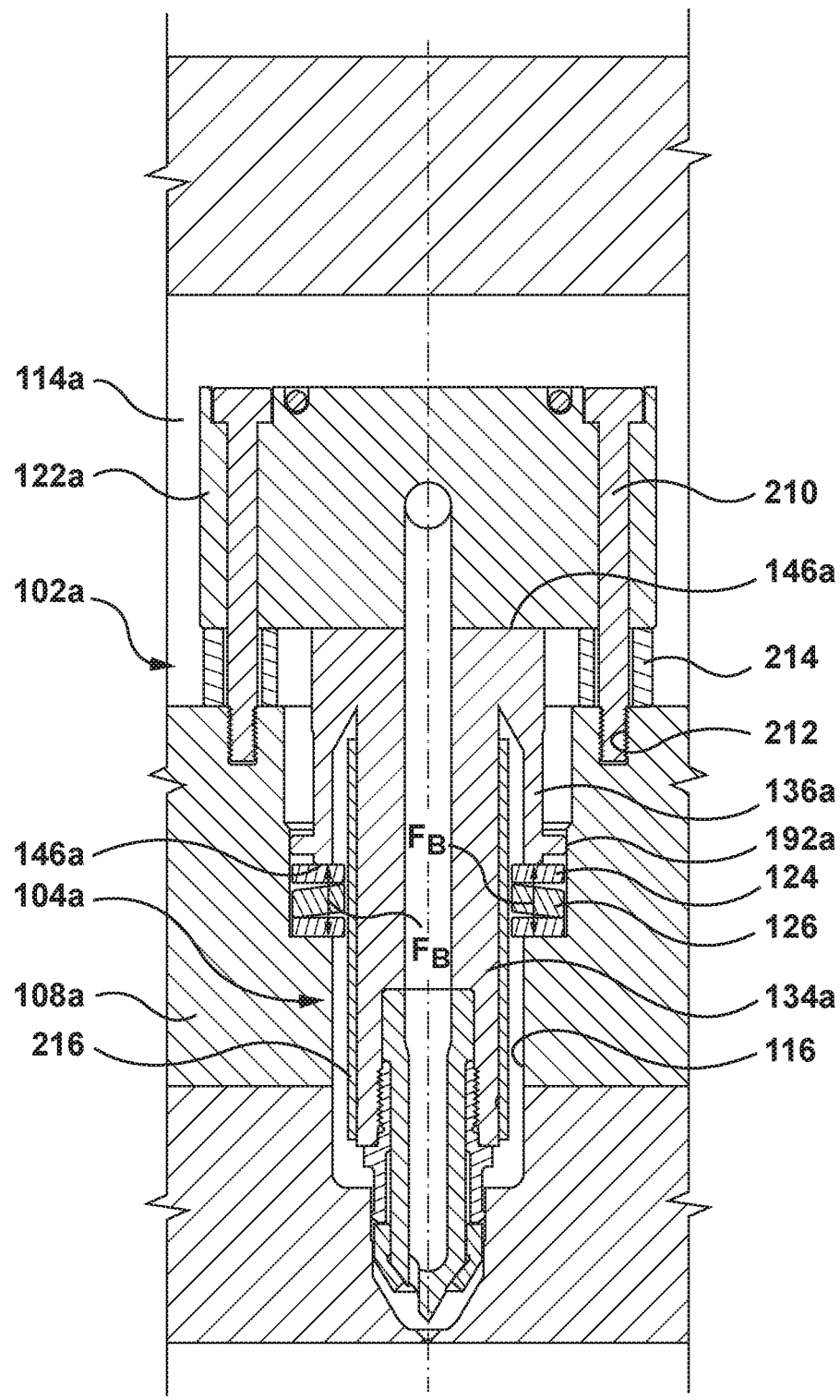
FIG. 7 is a sectional view of a portion of an injection molding apparatus having a hot runner system and a hot runner nozzle in accordance with yet another embodiment of the present disclosure.

Referring now to FIG. 7, which is a sectional view of a portion of an injection molding apparatus 100a having a hot runner system 102a and a hot runner nozzle 104a in accordance with yet another illustrated embodiment of the present disclosure. Features and aspects of the embodiments are similar to those previously described, and as such notable differences will be described. In comparison to the illustrated embodiments of FIGS. 1-6, in which biasing member 126 is compressed by securing third mold plate 110 to second mold plate 108 and by thermal expansion of manifold 122, an alternative way of compressing biasing member 126 is shown in the illustrated embodiment of FIG. 7 In which a manifold 122a is secured to a mold plate 108a by fasteners 210 that extend through manifold 122a and are received in threaded bores 212 in mold plate 108a to compress biasing member 126 upon tightening fasteners 210. Manifold 122a is supported within a manifold chamber 114a against an upstream end 146a of nozzle 104a and a manifold bearing member 214 which is sandwiched between manifold 122a and second mold plate 108a.

Fasteners 210 hold or pull manifold 122a against nozzle 104a, which press a nozzle seating surface 146a of nozzle collar 136a against nozzle bearing member 124, to thereby compress biasing member 126. With biasing member 126 compressed, biasing force $F_B$ (shown by arrows $F_B$ in FIG. 7) is transferred through nozzle bearing member 124 to urge nozzle 104a against manifold 122a so as to promote a fluid seal therebetween. Once fasteners 210 are tightened to the point where manifold 122a is seated against upstream end 146a of nozzle 104a and against manifold bearing member 214, biasing member 126 is generally fully compressed as manifold bearing member 214 prevents further displacement of manifold 122a in the downstream direction (downward in the page view of FIG. 7). In this arrangement, biasing force $F_B$ can be described as being generally independent of the temperature of manifold 122a.

In the illustrated embodiment of FIG. 7, nozzle 104a is heated by way of a removable heater 216 in which nozzle body 134a is received. By way of example, removable heater 216 can be a film heater, or a sleeve heater made from a generally conductive material, for example brass, and having an element heater received therein. Removable heater 216 extends along nozzle body 134a, from the downstream end of nozzle body 134a, through biasing member 126 and nozzle bearing member 124, and is surrounded by collar 136a which is spaced apart therefrom. In an alternative embodiment (not shown) removable heater 216 extends between a downstream end of nozzle body 134a and biasing member 126 such that only a downstream end of nozzle body 134 is actively heated, i.e., is in direct contact with a heater.

Continuing with FIG. 7, rather than having a sleeve between collar 136a and nozzle well 116, a collar protrusion 192a projects outward from collar 136a and engages with nozzle well 116 to coaxially align nozzle 104a with nozzle well 116.

While various embodiments have been described above, it should be understood that they have been presented only as illustrations and examples of the present invention, and not by way of limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that features of each embodiment discussed herein can be used in combination with the features of other embodiments.

What is claimed is:

1. A hot runner system comprising:
   a nozzle received in a well in a mold plate, the nozzle including a nozzle melt channel for delivering moldable material to a mold cavity, a heated nozzle body through which the nozzle melt channel extends, and a collar connected to the heated nozzle body, the collar surrounding and spaced apart from the heated nozzle body;
   a manifold seated against an upstream end of the nozzle, the manifold including a manifold melt channel having an inlet for receiving moldable material from a source and an outlet in fluid communication with the nozzle channel;
   a nozzle bearing member received in the well and against which a seating surface of the collar is supported; and
   a biasing member seated between a step in the well and the nozzle bearing member, the biasing member having a plate loading surface through which biasing force is applied to the mold plate and a nozzle loading surface through which biasing force is applied to the nozzle bearing member to urge the upstream end of the nozzle against the manifold when the biasing member is compressed,
   wherein the nozzle loading surface is concentric with the seating surface of the collar, and is circumferentially offset from, so as not to be in line with, the seating surface of the collar, and
   wherein the plate loading surface is concentric with the seating surface of the collar, and is circumferentially offset from, so as to not be in line with, the seating surface of the collar in the opposite direction as the nozzle loading surface is circumferentially offset from the seating surface of the collar.

2. The hot runner system of claim 1, further comprising a sleeve surrounding the collar, the sleeve having an external alignment surface extending therearound which is sized to mate with an upstream end of the well and an internal alignment surface sized to mate with an external surface of collar.

3. The hot runner system of claim 2, wherein the external alignment surface is defined by a protrusion extending circumferentially around and radially outward from the sleeve.

4. The hot runner system of claim 3, wherein the internal alignment surface is an inner circumferential surface of the sleeve interfacing with a collar protrusion extending radially outward from the collar.

5. The hot runner system of claim 4, wherein the sleeve includes an inner protrusion projecting inward towards the collar, the inner protrusion overlapping the collar protrusion so as to limit axial displacement of the sleeve in a direction away from the nozzle bearing member.

6. The hot runner system of claim 5, wherein the inner protrusion is axially spaced apart from the collar protrusion so as define an axial gap between the inner protrusion and the collar protrusion.

7. The hot runner system of claim 6, wherein the nozzle loading surface of the biasing member is in line with the step in the well and the sleeve, and the plate loading surface of the biasing member is in line with an insulating gap between the heated nozzle body and the collar and is seated against a plate bearing member, and the axial distance between the inner protrusion and the collar protrusion is sized such that the sleeve can be axially displaced relative to the collar by an amount that is equal to or greater than a calculated deflection amount of the nozzle bearing member at the nozzle loading surface when the biasing member is compressed.

8. The hot runner system of claim 2, wherein the sleeve and the nozzle bearing member are formed as a unitary component.

9. The hot runner system of claim 2, wherein the sleeve is made from a material that is less thermally conductive than the material from which the collar is made.

10. The hot runner system of claim 1, wherein the biasing member is a Belleville washer.

11. The hot runner system of claim 1, further comprising a plate bearing member sandwiched between the biasing member and the step in the well.

12. The hot runner system of claim 1, wherein the nozzle loading surface of the biasing member is in line with an insulating gap between the heated nozzle body and the collar and the plate loading surface of the biasing member is in line with the step in the well.

13. The hot runner system of claim 1, wherein the nozzle loading surface of the biasing member is in line with a gap between the collar and the well, and the plate loading surface of the biasing member is in line with an insulating gap between the heated nozzle body and the collar and is seated against a plate bearing member through which biasing force is applied against the mold plate.

14. The hot runner system of claim 1, wherein the size of a gap between the biasing member and the heated nozzle body is greater than the size of a gap between the biasing member and a portion of the well in which the biasing member is received.

15. The hot runner system of claim 1, wherein a heater by which the nozzle is heated surrounds the heated nozzle body and extends through the biasing member and the nozzle bearing member.

16. The hot runner system of claim 1, wherein the nozzle loading surface of the biasing member has a line-contact with the nozzle bearing member that is in line with an insulating gap between the heated nozzle body and the collar.

17. The hot runner system of claim 16, wherein the plate loading surface of the biasing member has a line-contact with the step in the well that is in line with a gap between the collar and the well.

18. The hot runner system of claim 16, further comprising a plate bearing member sandwiched between the biasing member and the step in the well, wherein the plate loading surface of the biasing member has a line-contact with the plate bearing member that is in line with a gap between the collar and the well and through which biasing force is applied against the mold plate.

* * * * *